US007001661B2

(12) United States Patent
Beaverson et al.

(10) Patent No.: US 7,001,661 B2
(45) **Date of Patent: *Feb. 21, 2006**

(54) PACKAGING MATERIAL

(75) Inventors: Neil Beaverson, Vadnais Heights, MN (US); Will Wood, Arden Hills, MN (US)

(73) Assignee: Cellresin Technologies, LLC.

( * ) Notice: Subject to any disclaimer, the term of this patent is extended or adjusted under 35 U.S.C. 154(b) by 170 days.

This patent is subject to a terminal disclaimer.

(21) Appl. No.: 10/219,090

(22) Filed: Aug. 13, 2002

(65) Prior Publication Data

US 2003/0113525 A1 Jun. 19, 2003

Related U.S. Application Data

(60) Provisional application No. 60/312,424, filed on Aug. 15, 2001.

(51) Int. Cl.
*B32B 7/02* (2006.01)

(52) U.S. Cl. ................. 428/297.4; 428/212; 428/292.2

(58) Field of Classification Search ................ 428/212, 428/292.1, 905, 402, 297.4; 206/809; 525/52
See application file for complete search history.

(56) References Cited

U.S. PATENT DOCUMENTS

| | | | | |
|---|---|---|---|---|
| 5,126,333 A | | 6/1992 | Martini et al. | |
| 5,429,628 A | * | 7/1995 | Trinh et al. | 604/359 |
| 5,492,947 A | | 2/1996 | Wood et al. | |
| 5,498,662 A | * | 3/1996 | Tanaka et al. | 525/54.2 |
| 5,883,161 A | * | 3/1999 | Wood et al. | 524/48 |
| 5,985,772 A | * | 11/1999 | Wood et al. | 442/70 |
| 2002/0192413 A1 | * | 12/2002 | Wood et al. | 428/35.7 |
| 2003/0129403 A1 | * | 7/2003 | Beaverson et al. | 428/402.24 |

FOREIGN PATENT DOCUMENTS

| | | |
|---|---|---|
| FR | 2 659 970 | 9/1991 |
| JP | 3215031 | 9/1991 |
| JP | 10151710 | 6/1998 |
| WO | WO 97/30122 | 8/1997 |
| WO | WO 97/33044 | 9/1997 |

* cited by examiner

*Primary Examiner*—Rena Dye
*Assistant Examiner*—Camie S. Thompson
(74) *Attorney, Agent, or Firm*—Fay Kaplun & Marcin, LLP

(57) ABSTRACT

Described is a packaging material which contains a matrix material coated with a thermoplastic polymer and an effective absorbing amount of a cyclodextrin material. The cyclodextrin material is selected from the group consisting of an α-cyclodextrin, a β-cyclodextrin, a γ-cyclodextrin or mixtures thereof. The packing material can act as a barrier with respect to permeants, such as water vapor, aromatic and aliphatic hydrocarbons, monomer compositions and residues, off odors, off flavors, perfumes, smoke, pesticides, toxic materials, etc. The barrier properties of the cyclodextrin material may be altered by modifying the moisture content of the cyclodextrin material prior to incorporating into the matrix material.

38 Claims, No Drawings

PACKAGING MATERIAL

This application claims the benefit of U.S. Provisional Patent Application 60/312,424 filed on Aug. 15, 2001 and entitled "Packaging Material" and is expressly incorporated herein, in its entirety, by reference.

The present invention relates to packaging materials having improved barrier properties and a process for the manufacture of said materials. In particular, the invention relates to cyclodextrin-containing packaging materials comprising thermoplastic polymer compounds, coated cellulosic materials or any other material used in the field of packaging.

Much attention has been directed to the development of packaging materials having improved barrier properties with respect to, e.g., contaminants or off-flavor compounds. In the field of packing, a variety of packaging materials are used. Especially materials comprising polymeric or thermoplastic compounds are widespread and used in the form of, e.g., films, coatings, semi-rigid or rigid sheets or containers, especially bottles. In addition to these plastic-based packaging materials, there are rigid or semi-rigid cellulosic packaging materials, including chipboard, boxboard, paperboard or cardboard materials.

Improving barrier properties, especially organic vapor barrier properties is an important goal for manufacturers of packaging materials, since one main field of application is in the provision of food-contact containers used to package, e.g., liquid products as for example mineral water, juices, carbonated soft drinks water or beer, but also coffee, ready to eat cereal, frozen pizza, chocolate products, dry mix gravies and soups, snack foods (chips, crackers, popcorn, etc.), baked foods, pastries, breads etc., dry pet food (cat food, etc.), butter or butter-flavor notes, meat products etc. Understandably, the odor and flavor properties of such a food product should not be affected by the entry of organic flavor-affecting compounds or the escape of the volatile flavoring substances over its storage life.

Of course, it is also necessary to provide non-food packaging materials or containers having improved barrier properties. For example, pharmaceutical products can be reactive to specific volatile substances and need to be protected from the ingress of these substances, since such reactions may cause a reduction of drug potency over the storage life.

Mobile or volatile, organic contaminant material or substances can derive from the environment, but also from the packaging material as for example from a printing chemical, a coating chemical or from any contaminant in recycled material. A permeant, contaminant or volatile in the meaning of the present invention is a substance that can exist in the atmosphere at a substantial detectable concentration and can be transmitted through a known material. A large variety of permeants or volatiles are known. Such permeants include water vapor, aromatic and aliphatic hydrocarbons, monomer compositions and residues, off odors, off flavors, perfumes, smoke, pesticides, toxic materials, etc. Especially polymeric materials often contain small concentrations of residual monomers, contaminants in the olefin feed, catalyst residues and other contaminants.

In PCT Application WO 97/33044, the use of cyclodextrin in rigid or semi-rigid cellulosic sheets is described. The cyclodextrin may act as a barrier or a trap for contaminants. The barrier properties of the material described in WO 97/33044 are based on entrapment of the respective permeants in the internal hydrophobic space of the cyclodextrin molecule. The cyclodextrin material is generally used in the form of a compatible, derivatized cyclodextrin. According to WO 97/33044, the preferred cyclodextrin is a derivatized cyclodextrin having at least one substituent group bonded to the cyclodextrin molecule.

Moreover, the PCT Application WO 97/30122 describes that the barrier properties of a thermoplastic polymer can be improved by forming a barrier layer with a dispersed compatible cyclodextrin derivative in the polymer.

According to an exemplary embodiment of the present invention, a packaging material having improved barrier properties is provided, the material comprising:

(a) a matrix material; and (b) uniformly dispersed in the matrix material, an effective absorbing amount of a cyclodextrin material; wherein the cyclodextrin is free of an inclusion complex compound and the cyclodextrin comprises an α-cyclodextrin, a β-cyclodextrin, a γ-cyclodextrin or mixtures thereof, having pendant moieties or substituents that render the cyclodextrin compatible with the matrix material, the cyclodextrin material having a moisture content of more than 0.3 wt.-% based on the cyclodextrin material.

It is believed that the moisture content of the cyclodextrin plays an important role with respect to the resulting barrier or trapping properties of the cyclodextrin-containing material. More precisely, it is believed that it is possible to regulate or optimize the barrier and trapping properties of a cyclodextrin-containing material by varying the moisture content in the cyclodextrin. In other words, it may be possible to selectively adjust the moisture content with respect to the intended purpose of the cyclodextrin-containing material or the volatile substances to be trapped. Depending on the moisture content of the cyclodextrin material the resulting material may be optimized for trapping or complexing diffusing permeants or impurities from the material.

A certain content of moisture in the cyclodextrin material may be necessary or is believed to be advantageous in achieving excellent barrier properties, especially with respect to diffusing permeants, of the corresponding cyclodextrin-containing materials.

The said moisture content essentially corresponds to the moisture content measured or determined prior to the incorporation of the cyclodextrin material into the matrix material. The moisture content of the cyclodextrin material may be in the range between 0.3 wt.-% and 5 wt.-%, more preferably between 0.3 wt.-% and 3 wt.-%. It may be especially preferable that the cyclodextrin material has a moisture content of more than 0.5 wt.-%, more preferably a moisture content in the range of 0.5 wt.-% and 2 wt.-% and most preferred between 0.75 wt.-% and 2 wt.-% of the cyclodextrin material. In the context of this present invention, moisture means water, including commonly occurring water as used in industrial processes and syntheses, but also pure water, as formed by vapor condensation or absorption. In special circumstances, cyclodextrin moisture content can be higher than 5 wt.-% if special processing equipment (e.g., vacuum stripping) is used to control moisture in the finished material matrix.

According to another exemplary embodiment of the present invention, a method for manufacturing a packaging material having improved barrier properties is provided, the material comprising:

(a) a matrix material; and (b) uniformly dispersed in the matrix material, an effective absorbing amount of a cyclodextrin material; wherein the cyclodextrin is free of an inclusion complex compound and the cyclodextrin comprises an α-cyclodextrin, a β-cyclodextrin, a γ-cyclodextrin or mixtures thereof, having pendant moieties or substituents that render the cyclodextrin compatible with the matrix material, wherein a cyclodextrin material having a moisture content of more than 0.3 wt.-%, based on the cyclodextrin material, is dispersed in the matrix material.

It is believed that it is often advantageous or may be necessary to use cyclodextrin material having at least a low moisture content. Surprisingly, the barrier properties of a material made of cyclodextrin having pendant moieties or substituents and a matrix material are not maximized if dry cyclodextrin material or cyclodextrin material having a moisture content below 0.3 wt.-% is used. Without wishing to be bound by any theory, it is believed that it has been experimentally shown that the absence of cyclodextrin moisture leads to greater complexation of residual impurities inherent in all thermoplastic resins. It is assumed that the inclusion complexation of impurities happens during any of the processing steps where the cyclodextrin is dispersed by mixing it into the molten plastic or by letting down a dry cyclodextrin/thermoplastic masterbatch into virgin polymer. Surprisingly, the presence of some moisture in the cyclodextrin reduces complexation during the compounding and conversion processing steps. Cyclodextrin levels between 0.5% and 2% may generally minimize or substantially prevent residual resin impurity complexation. Further, these levels of cyclodextrin moisture are believed to not adversely affect polymer morphology or cause other adverse barrier affect such as matrix pin holes, microscopic voids, etc. It is believed that one of the more important experimental findings is that the presence of some moisture in the cyclodextrin does not impede or reduce inclusion complex formation with diffusing permeants. When cyclodextrin with an appropriate moisture content is uniformly dispersed into the polymer yielding more cyclodextrin molecules essentially free of an inclusion complex, then more cyclodextrin may be available to form complexes with diffusing permeants which is believed to significantly improve the barrier characteristics of the matrix material.

According to yet another exemplary embodiment the present invention, the moisture content of the cyclodextrin material does not exceed 5 wt.-% of the cyclodextrin material. This is because of different reasons: moisture levels greater than 5 wt.-% would typically cause problems such as hydrolysis for condensation polymers and small bubbles in polyolefins for example. Moreover, a cyclodextrin material containing high moisture levels may not readily form complexes with the trapped substances or impurities contained in the matrix material during the processing phase. Accordingly, it is believed that the moisture content of the cyclodextrin material preferably is less than 5,0 wt.-% of the cyclodextrin material.

As described above, it is believed that the presence of some moisture in the cyclodextrin reduces complexation during the compounding and conversion processing steps and leads to packaging materials having excellent barrier properties. Conversely, if dry cyclodextrin material is dispersed during the processing phase into the matrix material at least the greatest amount of impurities resulting, e.g., from a polymeric or thermoplastic matrix material is removed. Accordingly, the use of dry cyclodextrin is a calculated measure for removing at least the greatest amount of volatile impurities and to minimize out-gassing or transfer of impurities from the matrix material. Said impurities for example are small concentrations of residual monomers (hexene, octene, decene, dodecene, tetradecene, styrene), contaminants in the olefin feed (satured or unsatured aliphatic and cyclic hydrocarbons), catalyst residues and other contaminants, e.g., in polymeric materials (e.g., thermo oxidation products such as aldehydes, ketones and acids).

Depending on the field of present invention or the desired properties of the packaging material, the resulting material may be optimized for trapping or complexing diffusing permeants or impurities from the material. In other words, it is believed that by selectively regulating the moisture content of the cyclodextrin material, according to another exemplary embodiment of the present invention, it may be possible to provide packaging materials having excellent barrier properties or to selectively trap impurities from the matrix material, thereby minimizing out-gassing or transfer of impurities from the matrix material.

For removing of at least the greatest amount of, e.g., polymer impurities and to minimize out-gassing or transfer of volatile impurities from the matrix material, dry cyclodextrin material may be dispersed during the processing phase into the molten polymer matrix. The improved barrier properties of the resulting material may be attributed to the dispersed cyclodextrin is diminished because some portion of the uncomplexed cyclodextrin forms a complex with polymer impurities during the molten processing phase. However, the barrier properties of the matrix material of course may be improved by incorporation of the dry cyclodextrin material. The amount of cyclodextrin that may form a complex during the processing phase is dependent upon the type (i.e., chemical structure) and amount of the impurities, the molecular weight and, of course, the dispersed cyclodextrin's cavity size and substituents.

According to yet another exemplary embodiment of the present invention, a packaging material having improved barrier properties and a reduced content of volatile impurities is provided, the material comprising:

(a) a matrix material; and (b) uniformly dispersed in the matrix material, an effective absorbing amount of a cyclodextrin material; wherein the cyclodextrin is free of an inclusion complex compound and the cyclodextrin comprises an α-cyclodextrin, a β-cyclodextrin, a γ-cyclodextrin or mixtures thereof, having pendant moieties or substituents that render the cyclodextrin compatible with the matrix material, wherein the cyclodextrin material has a moisture content of about 0 wt.-% based on the cyclodextrin material.

The term "about" makes it clear that there can be a very small content of moisture in the cyclodextrin material, e.g., a moisture content of below 0.1 wt.-%. Especially storing the barrier material containing dry cyclodextrin over a longer period of time can lead to a very small content of moisture, since dry cyclodextrin tends to pickup atmospheric moisture.

According to yet another exemplary embodiment of the present invention, a method for manufacturing a packaging material having improved barrier properties and a reduced content of volatile impurities is provided, the packaging material comprising:

(a) a matrix material; and (b) an effective absorbing amount of a cyclodextrin material; wherein the cyclodextrin is free of an inclusion complex compound and the cyclodextrin comprises an α-cyclodextrin, a β-cyclodextrin, a γ-cyclodextrin or mixtures thereof, having pendant moieties or substituents that render the cyclodextrin compatible with the matrix material, wherein the cyclodextrin material having a moisture content of about 0 wt.-% based on the cyclodextrin material is dispersed into the matrix material, so that impurities from the matrix material are trapped and out-gassing is minimized.

The barrier material according to an exemplary embodiment of the present invention can, e.g., be a film, a coating, a semi-rigid or rigid sheet or also a container, as for example a bottle made of said material having improved barrier properties. The material according to an aspect of the present invention having improved barrier properties can be used in combination with any other material. For example, the barrier material according to the present invention can be coextruded or laminated with polyiners providing a two layer film, a coated monolayer, bilayer or multilayer film, metal foil or paperboard having one or more extrusion coatings on a surface or both surfaces. The material having improved barrier properties may be a packaging material.

A matrix material according to an exemplary embodiment of the present invention can be a thermoplastic material including polymers made from monomers including ethylene, propylene, butylene, butadiene, styrene and others. Moreover, such thermoplastic polymeric materials include poly(acrylonitrile-co-butadiene-co-styrene) polymers, acrylic polymers such as the polymethylmethacrylate, poly-n-butyl acrylate, poly(ethylene-co-acrylic acid), poly(ethylene-co-methacrylate), etc.; cellophane, cellulosics including cellulose acetate, cellulose acetate propionate, cellulose acetate butyrate and cellulose triacetate, etc.; fluoropolymers including polytetrafluoroethylene (Teflon®), poly(ethylene-co-tetrafluoroethylene) copolymers, (tetrafluoroethylene-co-propylene) copolymers, polyvinyl fluoride polymers, etc., polyamides such as nylon 6, nylon 6,6, etc.; polycarbonates; polyesters such as poly(ethylene-co-terephthalate), poly(ethylene-co-1,4-naphthalene dicarboxylate), poly(butylene-co-terephthalate); polyimide materials; polyethylene materials including low density polyethylene; linear low density polyethylene, high density polyethylene, high molecular weight high density polyethylene, etc.; polypropylene, biaxially oriented polypropylene; polystyrene, biaxially oriented polystyrene; high-impact polystyrene (mixture of polystyrene and polybutadiene) vinyl films including polyvinyl chloride, (vinyl chloride-co-vinyl acetate) copolymers, polyvinylidene chloride, polyvinyl alcohol, (vinyl chloride-co-vinylidene dichloride) copolymers, specialty films including polysulfone, polyphenylene sulfide, polyphenylene oxide, liquid crystal polyesters, polyether ketones, polyvinylbutyral, etc.

According to yet another exemplary embodiment of the present invention, the packaging material comprises a cellulosic material, preferably a web or a layer comprising a continuous array of randomly oriented cellulosic fiber. The cellulosic material or cellulosic web can be provided with the inventive barrier layer comprising matrix material and cyclodextrin, e.g., by coating techniques, on one or both sides of the material or web.

Cellulosic materials such as a paperboard, a boxboard, a cardboard or a chipboard consists of relatively thick, compared with paper, sheet materials that are comprised of bonded, small discrete fibers comprising cellulose. Such fibers are typically held together by secondary bonds that, most probably, are hydrogen bonds. To form a cellulosic sheet, fiber is formed into a rough, web or sheet on a fine screen from a water suspension or dispersion of fiber, combined with fiber additives, pigments, binder material, secondary binder materials or other components. After the sheet is formed on a fine screen, the rough sheet is then dried, calendared and further processed to result in a finished sheet having a controlled thickness, improved surface quality, one or more coating layers, a fixed moisture content, etc. Further, after sheet formation the paperboard can be further coated, embossed, printed or further processed before rolling and distribution.

Cellulosic materials, as for example paperboard, can be made both from primary sources of fibers and from secondary or recycled fibrous materials. The fiber used in making paperboard largely comes directly from the forestry industry. However, increasingly paperboard is made from recycled or secondary fiber derived from paper, corrugated paperboard, woven and nonwoven fabric, and similar fibrous cellulosic materials. Such recycled material inherently contains recycled organic material such as inks, solvents, coatings, adhesives, residue from materials the fiber source contacted and other sources of material.

The packaging material of the present invention provides improved barrier resistance to permeants and/or impurities, e.g., from the polymer or the paperboard. Virgin and recycled paperboard fibers contain sorbed organoleptic contaminants (e.g., saturated and unsaturated aldehydes and ketones). Further, printing inks, especially lithographic printing inks, contribute significant amounts of residual volatile contaminants to paperboard. Printing inks contain a large number of solvents, as well as a series of oxidation products (e.g., aldehydes, ketones and acids) produced during the drying process. The material according to the present invention also is suitable for food-contact packaging and prevents the loss of flavors or volatile flavoring substances from the inside of the wrapped product or container or the bottle.

The preferred cyclodextrin derivative is selected, based on the functional group compatibility with the matrix material, the thermal stability of the cyclodextrin material and the cyclodextrin's ability to form an inclusion complex with volatile substances. The cyclodextrin derivative can contain one substituent on the single primary carbon hydroxyl and/or one substituent on one or both of the secondary carbon hydroxyls of each glucopyranose unit.

Cyclodextrin is commonly produced by a highly selective enzymatic synthesis. It generally consists of six, seven, or eight glucose monomers arranged in a donut shaped ring, which are denoted alpha-, beta-, or gamma-cyclodextrin, respectively. The specific coupling of the glucose monomers gives the cyclodextrin a rigid, truncated conical molecular structure with a hollow interior of a specific volume. This internal cavity is a key structural feature of the cyclodextrin, providing the ability to complex molecules (e.g., aromatics, alcohols, halides and hydrogen halides, carboxylic acids and their esters, etc.). The complexed molecule must satisfy the size criterion of fitting at least partially into the cyclodextrin internal cavity, resulting in an inclusion complex.

According to an exemplary embodiment of the present invention, the cyclodextrin is based on an alpha-cyclodextrin (alpha-CD), a beta cyclodextrin (beta-CD), a gamma-cyclodextrin (gamma-CD) or mixtures thereof. A preferred cyclodextrin derivative is, inter alia, selected based on the functional group compatibility with the matrix material on one hand and the cyclodextrin's ability to form an inclusion complex with targeted substances on the other hand.

Accordingly, a first requirement may be compatibility with the thermoplastic, as well as thermal stability in the manufacturing process. "Compatible" means that preferably the cyclodextrin material can be uniformly dispersed into the matrix material, can retain the ability to trap or complex diffusing permeants or residual polymer impurities, and can reside in the polymer without reducing the intrinsic barrier properties of the polymer by morphological changes caused by dispersing the cyclodextrine molecules in the polymer matrix.

Second, the cyclodextrin's internal cavity size (i.e., α, β, γ) must be considered. Any derivative functional group modification must be suitable for forming an inclusion complex with targeted volatiles or impurities. To achieve a specific result, providing more than one cavity size and functional group may be necessary. For example, blends of α and/or β that contain γ-cyclodextrin have greater complexation efficiencies for some volatile substances than blends without γ-cyclodextrin. Computational modelling indicates that the type and number of functional groups on the ring provide different complexation energies for specific ligands (i.e., complexed substances). These complexation energies ($\Delta E^{steric}$ and $\Delta E^{electrostatic}$) can be calculated for a specific derivative, cavity size and ligand. Hence, inclusion complexation is predictable to some extent. For example, it is believed that acetylated α-cyclodextrin, acetylated β-cyclodextrin and acetylated γ-cyclodextrin are very effective cyclodextrin derivatives for improving the barrier properties of the inventive barrier material.

The compatible cyclodextrin derivative according to an exemplary embodiment of the present invention is a compound substantially free of an inclusion complex. For this present invention, the term "substantially free of an inclusion complex" means that the quantity of the dispersed cyclodextrin material in the matrix material contains a large fraction having cyclodextrin free of a contaminant, a permeant or other inclusion compound in the interior of the cyclodextrin molecule. A cyclodextrin compound is typically added and mixed into the matrix without any inclusion compound but some complexing can occur and may be desirable during manufacture.

In principle, the preferred cyclodextrin derivative may contain one substituent on the single primary carbon hydroxyl and one substituent on one or both of the secondary carbon hydroxyls. Because of the geometry of the cyclodextrin molecule, and the chemistry of the ring substituents, the hydroxyl groups are not equal in reactivity. However, with care and effective reaction conditions, the cyclodextrin molecule can be reacted to obtain a derivatized molecule having a certain number of hydroxyl groups derivatized with a single substituent type. Further directed synthesis of a derivatized molecule with two different substituents or three different substituents is also possible. These substituents can be placed at random or directed to a specific hydroxyl. For the purposes of an exemplary aspect of this invention, a broad range of pendant substituent moieties may be used on the molecule. These derivatized cyclodextrin molecules may include alkyl ether, silyl ether, alkyl ester, including cyclodextrin esters such as tosylates, mesylate and other related sulfo derivatives, hydrocarbyl-amino cyclodextrin, alkyl phosphono and alkyl phosphato cyclodextrin, imidazoyl substituted cyclodextrin, pyridine substituted cyclodextrin, hydrocarbyl sulphur containing functional group cyclodextrin, silicon-containing functional group substituted cyclodextrin, carbonate and carbonate substituted cyclodextrin, carboxylic acid and related substituted cyclodextrin and others.

Acyl groups that can be used as compatibilizing functional groups include acetyl, propionyl, butyryl, trifluoroacetyl, benzoyl and acryloyl groups. The formation of such groups on the hydroxyls of the cyclodextrin molecule involve well known reactions. The acylation reaction can be conducted using the appropriate acid anhydride, acid chloride, and well-known synthetic protocols.

Cyclodextrin materials can also be reacted with alkylating agents to produce an alkylated cyclodextrin. Typical examples of alkyl groups useful in forming the alkylated cyclodextrin include methyl, propyl, benzyl, isopropyl, tertiary butyl, allyl, trityl, alkyl-benzyl and other common alkyl groups. Such alkyl groups can be made using conventional preparatory methods, such as reacting the hydroxyl group under appropriate conditions with an alkyl halide, or with an alkylating alkyl sulfate reactant.

Tosyl(4-methylbenzene sulfonyl), mesyl (methane sulfonyl) or other related alkyl or aryl sulfonyl forming reagents can also be used in manufacturing compatibilized cyclodextrin molecules.

Sulfonyl containing functional groups can be used to derivatize either of the secondary hydroxyl groups or the primary hydroxyl group of any of the glucose moieties in the cyclodextrin molecule. The reactions can be conducted using a sulfonyl chloride reactant that can effectively react with either primary or secondary hydroxyl. The sulfonyl chloride is used at appropriate mole ratios depending on the number of target hydroxyl groups in the molecule requiring substitution. Sulfonyl groups can be combined with acyl or alkyl groups.

The sulfonyl derivatized cyclodextrin molecule can be used to generate the amino derivative from the sulfonyl group substituted cyclodextrin molecule via nucleophilic displacement of the sulfonate group by an azide-ion. The azido derivatives are subsequently converted into substituted amino compounds by reduction. Large numbers of these azido or amino cyclodextrin derivatives have been manufactured. Examples of nitrogen containing groups that can be useful in the invention include acetylamino groups (—NHAc), alkylamino including methylamino, ethylamino, butylamino, isobutylamino, isopropylamino, hexylamino, and other alkylamino substituents. The amino or alkylamino substituents can further be reactive with other compounds that react with the nitrogen atom to further derivatize the amine group.

The cyclodextrin molecule also may be substituted with heterocyclic nuclei including pendent imidazole groups, histidine, imidazole groups, pyridino and substituted pyridino groups.

Cyclodextrin derivatives may be modified with sulfur containing functional groups to introduce compatibilizing substituents onto the cyclodextrin. Apart from the sulfonyl acylating groups mentioned above, sulfur containing groups manufactured based on sulfhydryl chemistry can be used to derivatize cyclodextrin. Such sulfur containing groups include methylthio (—SMe), propylthio (—SPr), t-butylthio (—S—$C(CH_3)_3$), hydroxyethylthio (—S—$CH_2CH_2OH$), imidazolylmethylthio, phenylthio, substituted phenylthio, aminoalkylthio and others. Based on the ether or thioether chemistry set forth above, cyclodextrin having substituents ending with a hydroxyl aldehyde ketone or carboxylic acid functionality can be prepared. Cyclodextrin with derivatives formed using silicone chemistry can contain compatibilizing functional groups.

Cyclodextrin derivatives with functional groups containing silicone, herein called silicon ether, can be prepared. Silicone groups generally refer to groups with a single substituted silicon atom or a repeating silicone-oxygen backbone with substituent groups. Typically, a significantly proportion of silicone atoms in the silicone substituent bear hydrocarbyl (alkyl or aryl) substituents. Silicone substituted materials generally have increased thermal and oxidative stability and chemical inertness. Further, the silicone groups increase resistance to weathering, add dielectric strength and improve surface tension. The molecular structure of the silicone group can be varied because the silicone group can have a single silicon atom or two to twenty silicon atoms in the silicone moiety, can be linear or branched, have a large number of repeating silicone-oxygen groups and can be further substituted with a variety of functional groups. For the purposes of this application the simple silicone containing substituent moieties are preferred including trimethylsilyl, mixed methyl-phenyl silyl groups, etc.

In exemplary embodiments of the present invention, the cyclodextrin material comprises substituents having a silyl ether group, an alkyl ether group and/or an alkyl ester group. According to an exemplary embodiment of the present invention, the alkyl ester substituents may comprise acetyl moieties, propyl moieties and/or butyl moieties, the alkyl ether substituents preferably comprise methyl moieties, ethyl moieties and/or propyl moieties and the silyl ether substituents preferably comprise methyl moieties, ethyl moieties, propyl moieties and/or butyl moieties.

According to yet another exemplary embodiment the present invention, the amount of cyclodextrin derivative in the matrix material preferably is in the range from about 0.01 to 5 wt-%, preferably from about 0.1 to 1 wt-%, based on the matrix material.

Polymers and cellulosic materials used in this invention may also contain other additives, which do not adversely affect the performance of the cyclodextrin, such as catalysts, stabilizers, processing aids, fillers, pigments, dyes and antioxidants.

According to yet another exemplary embodiment of the present invention, the barrier packaging material may be in the form of a coated cellulosic web or a cellulosic web/film laminate. The cyclodextrin can be a part of the web, the film or both. A film or a sheet is a flat unsupported section of, e.g., a thermoplastic resin whose thickness is much smaller than its width or length.

Films are generally regarded as being 0.20 millimeters (mm) or less, typically 0.01 to 0.20 mm thick. Sheet may range from about 0.25 mm to several millimeters (mm) typically 0.3 to 3 mm in thickness. Film or sheet can be used in combination with other sheet, structural units, etc., through lamination. Important properties include tensile strength, elongation, stiffness, tear strength and resistance; optical properties including haze, transparency; chemical resistance such as water absorption and transmission of a variety of permeant materials including water vapor and other permeants; electrical properties such as dielectric constant; and permanence properties including shrinkage, cracking, weatherability, etc.

According to yet another exemplary embodiment of the present invention, it is also contemplated to apply thermoplastic extrusion coating compositions containing a matrix material comprising inventive cyclodextrin derivatives having a certain moisture content in order to improve the barrier properties of the extrusion coated article. The extrusion coating can be one or several layers used as a coating or as an adhesive to laminate (sandwich) two webs together. Coated or laminated webs are flat substrates such as paper, paperboard, metal foil or plastic film.

According to yet another embodiment of the present invention, the modified cyclodextrin having a certain moisture content is dispersed in a thermoplastic material. The resulting barrier material can be a homogeneous material consisting of one single layer. In another exemplary embodiment of the present invention, it is also contemplated to provide or manufacture structured barrier materials, e.g., by coextrusion or laminating, thereby providing a two layer film, a coated monolayer, bilayer or multilayer film, metal foil or paperboard having one or more extrusion coatings on a surface or on both surfaces.

If the matrix material is a thermoplastic material, the barrier material according to another exemplary embodiment of the present invention comprising at least one thermoplastic polymer and a modified cyclodextrin can be created by, e.g., physically mixing and dispersing the minor constituent, i.e. modified cyclodextrin into the major constituent, i.e. the polymer, e.g., by extrusion. Suitable extrusion techniques include the so-called “direct incorporation” and “masterbatch addition”. In either method it is preferred to use high shear mixing equipment such as can be accomplished with twin-screw co-rotating segmented barrel extruders. Of course it is also possible to use counter rotating or single screw extruders for mixing or dispersing the cyclodextrin material into the polymeric material. It is clear that the modified cyclodextrin can be added individually or in combination with other suitable additives or adjuvants. After mixing or dispersing the cyclodextrin material into the polymeric material the resulting molten plastic is, e.g., pumped out of the extruder and pelletized.

Of course, thermoplastic materials can be formed into barrier films using a variety of processes including blown thermoplastic extrusion, linear biaxially oriented film extrusion and by casting from molten thermoplastic resin. These methods are well known manufacturing procedures.

Skilled artisans manufacturing thermoplastic polymers have learned to tailor the polymer material for thermoplastic processing and particular end use application by controlling molecular weight (the melt index has been selected by the thermoplastic industry as a measure of molecular weight—melt index is inversely proportional to molecular weight, density and crystallinity). For blown thermoplastic extrusion polyolefins (polyalpha olefins such as LDPE low density polyethylene, LLDPE linear low density polyethylene, HDPE high density polyethylene) are the most frequently used thermoplastic polymers, although polypropylene, nylon, nitrites, PETG and polycarbonate are sometimes used to make blown film.

According to an exemplary embodiment of the present invention, polyesters and nylons may also be used. For casting, molten thermoplastic resin or monomer dispersion are typically produced from polyethylene or polypropylene. Occasionally, nylon, polyester and PVC are cast. For roll coating of aqueous based acrylic, urethane and PVDC, etc., dispersions are polymerized to an optimum crystallinity and molecular weight before coating.

The foregoing illustrates various exemplary embodiments of improved organic vapor barrier and the reduction of residual thermoplastic resin volatile impurities. The following examples and data further exemplify selectively regulating the cyclodextrin moisture content to optimize the package structure material for trapping or complexing diffusing permeants or residual impurities in the matrix material.

Static Permeation Test. Permeation across a barrier can be explained where the membrane at time zero ($t_o$) is initially free from permeant vapor. The permeant pressure $p_2$ at the upstream face of the membrane is increased giving a concentration in the surface layer $c_2$. The downstream pressure, $p_1$, while measurable, is negligible at small times relative to the upstream pressure $p_2$. The amount of vapor permeating the film increases linearly with time once steady state has been reached. At large times, the upstream pressure $p_2$ will equal the downstream pressure $p_1$.

The method involves measuring organic molecule transport across a membrane using a static concentration gradient. High-resolution gas chromatography (HRGC) operated with a flame ionization detector (FID) is used to measure the cumulative downstream penetrant concentration. Disc samples (1,020 um thick×1.27 cm diameter and weighing 122 mg) were tested in a closed volume permeation device. The experimental aluminum measurement cell has two compartments (i.e., cells) separated by the disc under study (disc area=5.3 $cm^2$) and capped at both ends using a Teflon faced butyl rubber septa and aluminum crimp-tops.

A test disc is placed into the upper cell; the cell is assembled using an o-ring to firmly seal the test disc, and screws to pull the upper and lower cells together. Next the upper cell is capped with a Teflon faced butyl rubber septa and aluminum crimp-top. The permeant water/surfactant mixture is injected into the lower cell providing a concentration of octanal, nonanal, trans-2-nonenal and 1-octen-3-one of 98, 91, 89, and 103 parts per million—uL/L (vol./vol.) using gas laws. The lower cell is immediately capped with a Teflon faced butyl rubber septa and aluminum crimp-top and placed into a controlled 50° C. chamber until analysis.

HRGC operated with a flame ionization detector (FID) is used to measure the change in cumulative penetrant concentration at time $t_{1/2}$ in the upstream cell. At the end of $t_{1/2}$, a sample is collected by solid phase microextraction (SPME) from the upper cell and analyzed by HRGC/FID. Individual permeant concentrations are determined from calibration standards and measured in nL/L or parts per billion (vol./vol.) using gas laws.

Residual Resin Volatiles Tests. Volatile compounds in the resin sample out-gas into the vial's headspace during confinement. An aliquot of the volatiles are then removed from the vial's headspace and the individual components subsequently identified and quantitated by HRGC/FID or by HRGC using mass spectrometry (MS) as the detector.

Aldehydes and Ketone by HRGC/FID. A 2.00+/−0.02-gram sample is placed into a 22-ml glass headspace vial. The vial is capped using a Teflon faced septa and aluminum crimp-top. Residual resin volatiles are desorbed from the sample into the headspace by heating the vial at 85° C. for 24-hours. At the end of the time interval, a sample is collected by solid phase microextraction (SPME) and analyzed by HRGC/FID. Individual compound concentrations are determined from calibration standards and measured in ng/g or parts per billion (wt./wt.).

Hydrocarbons by HRGC/MS. A 2.00+/−0.02-gram sample is placed into a 22-ml glass headspace vial. The vial is capped using a Teflon faced septa and aluminum crimp-top. Residual resin volatiles are desorbed from the sample into the headspace by heating the vial at 120° C. for 45-minutes. At the end of the time interval, a 1-ml aliquot sample of the vial's headspace is collected using an automated headspace sampler. Quantitation is carried out with an internal standard and surrogate standard, all added prior to sealing the vial. Individual compound concentrations are determined from calibration standards and measured in ng/g or parts per billion (wt./wt.).

EXAMPLE 1

This permeation example demonstrates the importance cyclodextrin moisture content plays in improving organic vapor barrier prior to compounding and forming a barrier structure. A polymer blend containing HDPE and EVA was compounded with triacetyl- alpha, beta and gamma cyclodextrin containing different moisture levels. The cyclodextrin was added at 0.40 wt.-% to the thermoplastic blend and compounded along with a control resin (no cyclodextrin) on a Brabender mixer. Test samples are prepared by placing virgin resin into the Brabender mixing bowl heated to 125° C., with the blade RPM initially set at 30 and then increased to 80 RPM as the cyclodextrin is fed into the bowl over 30 seconds. After another five minutes of processing, the screw speed is reduced to zero and the molten resin removed. Next, the compounded resin/cyclodextrin blend is molded into test coupons using an Atlas Molder Mixer. From the molded coupons (dimensions of 4.45 cm×1.78 cm×0.102 cm), 1.25 cm diameter discs are punched out for testing. The discs are tested for barrier properties using the static permeation method. The time where $p_2=p_1$ was determined to be twelve (12) hours with the slowest diffusing permeant of the four test permeants, while $t_{1/2}$ was calculated to be six (6) hours. Dry cyclodextrin used in the test was dried to a "non detectable" (ND) level.

Table 1 contains the mass flux $p_1$ in parts per billion (nL/L—vol./vol.) at time=$t_{1/2}$ and the cyclodextrin water concentration at the time of compounding and subsequently forming the structure for testing.

TABLE 1

Permeant Flux Concentration as a Function of Cyclodextrin Water Concentration.

| HDPE/EVA Test Discs | | Permeant Flux Concentration - $p_1$ at $t_{1/2}$ | | | |
|---|---|---|---|---|---|
| Cyclodextrin | % $H_2O$ in Cyclodextrin | 1-octen-3-one nL/L | Octanal nL/L | Nonanal nL/L | t-2-nonenal nL/L |
| Control | NA | 40.9 | 59.4 | 11.7 | 7.96 |
| W6TA | ND | 38.0 | 55.1 | 9.85 | 7.18 |
| W6TA | 0.90 | 34.1 | 55.4 | 8.97 | 5.45 |
| W7TA | ND | 43.6 | 63.6 | 11.5 | 7.47 |
| W7TA | 0.50 | 34.4 | 51.4 | 8.89 | 6.61 |
| W8TA | ND | 33.7 | 41.2 | 6.54 | 5.56 |
| W8TA | 1.9 | 11.6 | 16.2 | 2.22 | 3.27 |

Key:
W6TA = Triacetyl alpha cyclodextrin, Degree of Substitution 3.0
W7TA = Triacetyl beta cyclodextrin, Degree of Substitution 3.0
W8TA = Triacetyl gamma cyclodextrin, Degree of Substitution 3.0
ND = "non detectable", The wt. % content of water is determined by gravimetric analysis methods (detection limit: 0.01 wt. %)

Table 1 shows the correlation between the concentration of water in the cyclodextrin and barrier effectiveness for aldehyde permeant flux reduction across the structure; mass flux from the high concentration side $p_2$ to the low concentration side $p_1$. In each of the test examples in Table 1, increasing the concentration of water in the cyclodextrin at the time of compounding improved organic vapor barrier. In the W8TA test example, increasing the cyclodextrin water concentration to 1.9 wt.-% doubles the effectiveness of the barrier produced from cyclodextrin having a moisture concentration of about 0 wt.-%. After considering the most suitable (i.e., derivative functional groups, number of pendent substitutions, ring size, compatibility and thermal stability) cyclodextrin derivative for the targeted permeants, the cyclodextrin moisture content can be selectively adjusted to maximize the barrier properties of the matrix. Alternatively demonstrated in examples 2, 3 and 4 below, low cyclodextrin moisture content favors complexing and trapping residual resin volatile impurities inherent in all thermoplastic resins. When the cyclodextrin is compounded into the matrix material with a moisture content of 0.50 wt.-% or greater more cyclodextrin molecules are free of an inclusion complex and accordingly more cyclodextrin is available to form complexes with diffusing permeants significantly improving the barrier characteristics of the matrix material.

EXAMPLE 2

This example demonstrates the importance of lowering the cyclodextrin moisture content prior to compounding to complex residual resin volatiles. The five aldehydes in Table 2 are organoleptic impurities typically formed from thermo oxidation and photo degradation of the PP resin. The reduction of these and other organoleptic compounds are important to reduce off-flavor transfer. A polypropylene (PP) homopolymer was compounded with acetyl and methyl beta cyclodextrin containing low and high moisture concentrations. Both cyclodextrins were added at 0.30 wt.-% to the PP and compound on a Brabender mixer. Test samples are prepared by placing virgin resin into the Brabender mixing bowl heated to 190° C., with the blade RPM initially set at 30 and then increased to 80 RPM as the cyclodextrin is fed into the bowl over 30 seconds. After another five minutes of processing, the screw speed is reduced to zero and the molten resin removed. Compounded PP materials are milled into shavings having ~20 um thickness for residual resin volatile testing. Replicate samples and control were analyzed by the aldehydes and ketone HRGC/FID method. Table 2 contains the concentration of volatiles in parts per billion (ng/g-wt./wt.) and the cyclodextrin water concentration at the time of compounding.

TABLE 2

Residual Polypropylene Aldehyde Concentrations as a Function of Cyclodextrin Water Concentration.

| Polypropylene Test Samples | | Residual PP Aldehyde Concentrations | | | | |
|---|---|---|---|---|---|---|
| Cyclodextrin | % $H_2O$ in Cyclodextrin | Octanal ng/g | Nonanal ng/g | Decanal ng/g | t-2-Decenal ng/g | Undecanal ng/g |
| Control | NA | 2.30 | 33.9 | 4.26 | 2.22 | 81.7 |
| W7A | ND | 1.32 | 31.2 | 3.73 | 0.89 | 77.0 |
| W7A | 4.4 | 3.78 | 41.5 | 15.4 | 1.89 | 84.9 |
| W7M | ND | 0.74 | 26.9 | 1.77 | 0.85 | 64.8 |
| W7M | 5.2 | 2.48 | 39.2 | 6.28 | 1.10 | 83.5 |

Key:
W7A = Acetyl alpha cyclodextrin, Degree of Substitution 1.1
W7M = Methyl beta cyclodextrin, Degree of Substitution 0.6
ND = "non detectable", The wt. % content of water is determined by gravimetric analysis methods (detection limit: 0.01 wt. %)

The data in Table 2 illustrate lowering the cyclodextrin moisture content to optimize complexing residual impurities in the PP material. In the above examples, compounding dry cyclodextrin into the thermoplastic is preferred to remove the greatest amount of volatile aldehyde impurities from the matrix material thereby minimizing out-gassing or transfer of volatile taints. Specific aldehyde (e.g., octanal) reduction as high as 68% was achieved with W7M with a moisture content of about 0 wt.-%. In the cyclodextrin samples with 4 and 5 wt.-% moisture content, only small or no aldehyde reduction was reached. In the examples with high moisture, sometimes an aldehyde increase was measured. Without wishing to be bound by any theory, increased aldehyde concentrations in the high moisture cyclodextrin samples over the control sample are believed to be shallow cavity complexes (i.e., the cyclodextrin possesses one or more binding sites where portions of the guest molecule interact with the cyclodextrin rim or shallowly insert into the cyclodextrin cavity by sterically capable molecules) formed during compounding that have low complexation energies. The aldehydes guest molecules with low association energies are subsequently dissociated from the cyclodextrin and released during the heating step (85° C. for 24 hours) in the analytical method. When cyclodextrin is not present during the compounding process, some of the residual resin products are volatilized from the resin into the atmosphere due to the high processing temperature and large surface area exposure caused by the manipulation of the molten resin. Reversible residual resin volatile association/dissociation with high moisture content cyclodextrin reduces residual resin volatile release from the molten resin during the Brabender compounding step only later to be released in the analytical test providing an increase over non-cyclodextrin containing resin.

Polypropylene resin contains a very complex mixture of volatile hydrocarbons. There are over fifty individual compounds present in the samples analyzed in Table 3. The residual resin volatiles are principally branched alkanes, alkenes and cycloalkanes. The reduction of these hydrocarbon volatiles are general less important than low odor and taste threshold residual volatiles, e.g., aldehydes. When improving the barrier materials characteristics of the matrix material like PP, increasing the moisture level in the cyclodextrin to minimize total residual hydrocarbon complexation so more cyclodextrin molecules are free of a complex and are then available to form complexes with diffusing permeants.

A polypropylene (PP) homopolymer was compounded with triacetyl alpha and gamma cyclodextrin containing low and high moisture concentrations. Both cyclodextrins were added at a 0.30 and 0.40 wt.-% to the PP and compound on a Brabender mixer as previously stated. Replicate samples and control were analyzed by the aldehydes and ketone HRGC/FID method. Since the total hydrocarbon chromatographic profile is complex for the reasons stated above, the reductions shown in Table 3 are based on chromatographic peak areas. The total hydrocarbon reductions are calculated from total peak area of the cyclodextrin samples relative to the control.

TABLE 3

Residual Polypropylene Total Hydrocarbon Reduction as a Function of Cyclodextrin Water Concentration.

| Polypropylene Test Samples | | | Total Residual Hydrocarbons |
|---|---|---|---|
| Cyclodextrin | Wt. % $H_2O$ in Cyclodextrin | Wt. % CD Loading | % Reduction Relative to Control |
| W6TA | ND | 0.30 | 31.7 |
| W6TA | ND | 0.40 | 37.3 |
| W6TA | 6.2 | 0.30 | 12.4 |
| W6TA | 6.2 | 0.40 | 19.5 |
| W8TA | ND | 0.30 | 22.3 |
| W8TA | ND | 0.40 | 29.4 |
| W8TA | 5.1 | 0.30 | 14.4 |
| W8TA | 5.1 | 0.40 | 12.5 |

Key:
W6TA = Triacetyl alpha cyclodextrin, Degree of Substitution 3.0
W8TA = Triacetyl gamma cyclodextrin, Degree of Substitution 3.0
ND = "non detectable", The wt. % content of water is determined by gravimetric analysis methods (detection limit: 0.01 wt. %)

Table 3 illustrates low water content cyclodextrin is approximately twice as effective in reducing total hydrocarbon volatiles in the PP resin than higher moisture content cyclodextrin.

EXAMPLE 3

In contrast to PP, HDPE contains fewer residual hydrocarbon volatiles than PP. Typically HDPE residual volatiles are a series of monomers (e.g., hexene, octene, decene, dodecene, etc.) and saturated monomers and oligomers (e.g., hexane, octane, decane, etc.). This example demonstrates the importance cyclodextrin moisture content plays in compounding a masterbatch, and moisture uptake by the masterbatch during high humidity storage. A HDPE was compounded on a twin screw ZSK 30 compounding extruder with 5 wt.-% triacetyl-alpha and beta cyclodextrin containing different moisture levels. Primary and secondary antioxidants (Irganox 1010 and Irgafos 168) were added at 250 ppm each. The three compounded HDPE materials (control without cyclodextrin was compounded identically as the two HDPE/cyclodextrin samples) were pelletized and the pellets used for residual hydrocarbon volatile testing. Replicate samples and control were analyzed according to the hydrocarbons by HRGC/MS method. Table 4 contains the concentration of seven hydrocarbon volatiles in parts per billion (ng/g-wt./wt.) and the cyclodextrin water concentration at the time of compounding.

Table 4 illustrates low water content cyclodextrin in a 5 wt.-% cyclodextrin masterbatch is more effective in reducing total hydrocarbon volatiles in the PP resin than higher moisture content cyclodextrin.

EXAMPLE 4

In this example, the cyclodextrin was dried to a non detectable moisture level before compounding. The three compounded HDPE materials (control without cyclodextrin and two HDPE/cyclodextrin samples) were compounded in an identical manner as example #3. The pellets produced from the compounding experiments were then subjected to chambers containing saturated aqueous salt solutions. A precise percent relative humidity is produced at a given temperature in a confined hermetic chamber. Table 5 shows the two masterbatch samples subjected to different time, temperature and humidity storage conditions and their corresponding water moisture pickup. The control resin without cyclodextrin did not pickup a detectable amount of moisture and, therefore, was omitted from Table 5. The moisture levels in Table 5 are based on the weight of the cyclodextrin in the masterbatch and not the total resin/cyclodextrin weight.

TABLE 4

Residual HDPE Hydrocarbon Concentrations as a Function of Cyclodextrin Water Concentration.

| HDPE Master Batch Test Samples | | Residual HDPE Hydrocarbon Concentrations | | | | | | |
|---|---|---|---|---|---|---|---|---|
| Cyclodextrin | % $H_2O$ in Cyclodextrin | Hexane ng/g | Decene ng/g | Decane ng/g | Dodecene ng/g | Dodecane ng/g | Tetradecene ng/g | Tetradecane ng/g |
| Control | NA | 0.35 | 0.34 | 0.16 | 0.40 | 0.08 | 0.18 | 0.04 |
| W6TA | ND | 0.10 | 0.18 | 0.10 | 0.28 | 0.06 | 0.13 | 0.03 |
| W6TA | 0.50 | 0.20 | 0.25 | 0.11 | 0.28 | 0.06 | 0.13 | 0.03 |
| W6TA | 1.2 | 0.77 | 0.40 | 0.18 | 0.42 | 0.09 | 0.16 | 0.06 |
| W7TA | 0.80 | 0.22 | 0.30 | 0.13 | 0.36 | 0.07 | 0.15 | 0.03 |
| W7TA | 2.0 | 0.82 | 0.42 | 0.19 | 0.44 | 0.09 | 0.17 | 0.06 |
| Control | NA | 0.46 | 0.36 | 0.17 | 0.42 | 0.04 | 0.13 | 0.05 |

Key:
W6TA = Triacetyl alpha cyclodextrin, Degree of Substitution 3.0
W7TA = Triacetyl beta cyclodextrin, Degree of Substitution 3.0
ND = "non detectable", The wt. % content of water is determined by gravimetric analysis methods (detection limit: 0.01 wt. %)

TABLE 5

Percent Water Uptake in HDPE Masterbatch at Different Temperature, Humidity and Time Conditions.

| Temperature/Humidity | Percent Water Uptake Based on Cyclodextrin Weight | |
|---|---|---|
| Storage Condition | 5 wt. % W6TA in HDPE | 5 wt. % W7TA in HDPE |
| 24 Hrs at 30° C. & 84% RH | 0.20 | 0.33 |
| 168 Hrs at 30° C. & 84% RH | 0.40 | 0.76 |
| 25 Hrs at 40° C. & 81.7% RH | 0.35 | 0.36 |
| 98 Hrs at 40° C. & 81.7% RH | 0.58 | 0.74 |
| 190 Hrs at 40° C. & 81.7% RH | 0.56 | 0.87 |

TABLE 5-continued

Percent Water Uptake in HDPE Masterbatch at Different Temperature, Humidity and Time Conditions.

| Temperature/Humidity | Percent Water Uptake Based on Cyclodextrin Weight | |
|---|---|---|
| Storage Condition | 5 wt. % W6TA in HDPE | 5 wt. % W7TA in HDPE |
| 79 Hrs at 50° C. & 90% RH | 1.04 | 1.44 |
| 148 Hrs at 50° C. & 90% RH | 1.12 | 1.70 |

Key:
W6TA = Triacetyl alpha cyclodextrin, Degree of Substitution 3.0
W7TA = Triacetyl beta cyclodextrin, Degree of Substitution 3.0

The masterbatch samples in Table 5 were dried in a vacuum oven operated at 100° C. at 2.2" of Hg vacuum for one hour to reduce the moisture level picked up by the masterbatch pellets during the humidity storage. The dried masterbatch samples were then letdown with virgin HDPE resin at a ratio of one part masterbatch to nine parts virgin HDPE resin. Test samples are prepared by placing virgin resin and masterbatch resin into the Brabender mixing bowl heated to 190° C., with the blade RPM initially set at 30 and then increased to 80 RPM as the cyclodextrin is fed into the bowl over 30 seconds. After another five minutes of processing, the screw speed is reduced to zero and the molten resin removed. Compounded materials are milled into shavings having ~20 um thickness for residual resin volatile testing. Replicate samples and control were analyzed according to the hydrocarbons by HRGC/MS method. Table 6 contains the concentration of seven hydrocarbon volatiles in parts per billion (ng/g-wt./wt.) and the humidity storage condition prior to compounding.

The test results in Table 6 demonstrate that a cyclodextrin masterbatch can be stored under time, temperature and humidity storage conditions that allow the masterbatch to pickup residual moisture, then the masterbatch can be dried to remove the moisture, and finally let down into virgin resin and be functional for removing residual HDPE resin volatiles.

The invention claimed is:

1. A packaging material having improved barrier properties, the packaging material comprising:

(a) a matrix material; and (b) an effective absorbing amount of a cyclodextrin material; wherein the cyclodextrin material is uniformly dispersed in the matrix material; wherein the cyclodextrin material is free of an inclusion complex compound; wherein the cyclodextrin material comprises at least one element selected from the group consisting of α-cyclodextrin, β-cyclodextrin and γ-cyclodextrin each having pendant moieties or substituents that render the

TABLE 6

Residual HDPE Hydrocarbon Concentrations in Letdown Materbatch Resin as a Function of Cyclodextrin Water Concentration.

| HDPE Letdown Test Samples | | Residual HDPE Hydrocarbon Concentrations | | | | | | |
|---|---|---|---|---|---|---|---|---|
| Cyclodextrin | Humidity Storage | Hexane ng/g | Decene ng/g | Decane ng/g | Dodecene ng/g | Dodecane ng/g | Tetradecene ng/g | Tetradecane ng/g |
| Control | Pre-humidity | 0.35 | 0.34 | 0.16 | 0.40 | 0.08 | 0.18 | 0.04 |
| Control | 168 Hrs at 30 C. & 84% RH | 0.15 | 0.28 | 0.14 | 0.33 | 0.06 | .018 | 0.04 |
| Control | 190 Hrs at 40 C. & 81.7% RH | 0.08 | 0.24 | 0.12 | 0.34 | 0.07 | 0.16 | 0.07 |
| Control | 148 Hrs at 50 C. & 90% RH | 0.06 | 0.20 | 0.11 | 0.29 | 0.06 | 0.13 | 0.09 |
| W6TA | Pre-humidity | 0.20 | 0.25 | 0.11 | 0.28 | 0.06 | 0.13 | 0.03 |
| W6TA | 168 Hrs at 30 C. & 84% RH | 0.11 | 0.25 | 0.12 | 0.35 | 0.07 | 0.13 | 0.05 |
| W6TA | 190 Hrs at 40 C. & 81.7% RH | 0.06 | 0.19 | 0.10 | 0.34 | 0.07 | 0.11 | 0.05 |
| W6TA | 148 Hrs at 50 C. & 90% RH | 0.05 | 0.18 | 0.09 | 0.29 | 0.06 | 0.10 | 0.08 |
| W7TA | Pre-humidity | 0.22 | 0.30 | 0.13 | 0.36 | 0.07 | 0.15 | 0.03 |
| W7TA | 168 Hrs at 30 C. & 84% RH | 0.11 | 0.25 | 0.13 | 0.36 | 0.07 | 0.12 | 0.05 |
| W7TA | 190 Hrs at 40 C. & 81.7% RH | 0.06 | 0.19 | 0.10 | 0.34 | 0.07 | 0.11 | 0.05 |
| W7TA | 148 Hrs at 50 C. & 90% RH | 0.05 | 0.18 | 0.09 | 0.29 | 0.06 | 0.10 | 0.08 |

Key:
W6TA = Triacetyl alpha cyclodextrin, Degree of Substitution 3.0
W7TA = Triacetyl beta cyclodextrin, Degree of Substitution 3.0 cyclodextrin compatible with the matrix material; and wherein the cyclodextrin material has a moisture content of more than 0.3 wt.-% based on the cyclodextrin material.

2. The packaging material of claim 1, wherein the moisture content of the cyclodextrin material is in the range between 0.3 wt.-% and 5 wt.-%, of the cyclodextrin material.

3. The packaging material of claim 1, wherein the matrix material is a thermoplastic material.

4. The packaging material of claim 3, wherein the thermoplastic material is selected from the group consisting of polyolefins, polyesters and polyamides.

5. The packaging material of claim 4, wherein the thermoplastic material comprises a polyolefine selected from the group consisting of high density polyethylene (HDPE), low density polyethylene (LDPE), polystyrene (PS), polyvinyl chloride and ethlyene vinyl alcohol (EVOH).

6. The packaging material of claim 4, wherein the thermoplastic polymer comprises a polyester resin selected from the group consisting of polyethylene terephthalate (PET) homopolymer, polyethylene terephthalate copolymers and polyethylene naphthenate copolymers.

7. The packaging material according to claim 1, wherein the packaging material comprises a cellulosic material having a continuous array of randomly oriented cellulosic fibers.

8. The packaging material of claim 1, wherein the amount of cyclodextrin derivative in the matrix material is in the range from about 0.01 to 5 wt-% based on the matrix material.

9. The packaging material of claim 1, wherein the cyclodextrin material comprises substituents selected from the group consisting of a silyl ether group, an alkyl ether group, an alkyl alcohol group and an alkyl ester group.

10. The packaging material of claim 9, wherein the alkyl ester substituents comprise at least one of acetyl moieties, propyl moieties and butyl moieties.

11. The packaging material of claim 9, wherein the alkyl ether substituents comprise at least one of methyl moieties, ethyl moieties and propyl moieties.

12. The packaging material of claim 9, wherein the silyl ether substituents comprise at least one of methyl moieties, ethyl moieties, propyl moieties and butyl moieties.

13. The packaging material of claim 9, wherein the alkyl alcohol substituents comprise at least one of hydroxypropyl moieties and hydroxyethyl moieties.

14. The packaging material of claim 1, wherein the packaging material comprises at least two layers, wherein at least one layer of the at least two layers comprises a matrix material and a cyclodextrin material.

15. The packaging material of claim 14, wherein the at least one layer of the at least two layers comprising the matrix material and the cyclodextrin material is one of a coating layer and a laminate film layer.

16. The packaging material of claim 1, wherein the packaging material has a form selected from the group consisting of a coated monolayer film, a coated bilayer film, a coated multilayer film, a metal foil, a paperboard having one or more extrusion coatings on a surface or on both surfaces, a coated cellulosic web and a cellulosic web/film laminate, wherein the cyclodextrin material is a part of at least one of the web, the film and the coating.

17. A method for manufacturing a packaging material comprising the steps of:

providing a matrix material; and dispersing a cyclodextrin material having a moisture content of more than 0.3 wt.-%, based on the cyclodextrin material in the matrix material.

18. A packaging material having improved barrier properties and a reduced content of volatile impurities, the material comprising:

(a) a matrix material; and (b) an effective absorbing amount of a cyclodextrin material; wherein the cyclodextrin material is uniformly dispersed in the matrix material; wherein the cyclodextrin material is free of an inclusion complex compound; wherein the cyclodextrin material comprises at least one element selected from the group consisting of α-cyclodextrin, β-cyclodextrin and γ-cyclodextrin each having pendant moieties or substituents that render the cyclodextrin compatible with the matrix material; and wherein the cyclodextrin material has a moisture content of about 0 wt.-% based on the cyclodextrin material.

19. The packaging material of claim 18, wherein the matrix material is a thermoplastic material.

20. The packaging material of claim 19, wherein the thermoplastic material is selected from the group consisting of polyolefins, polyesters and polyamides.

21. The packaging material of claim 20, wherein the thermoplastic material comprises a polyolefine selected from the group consisting of high density polyethylene (HDPE), low density polyethylene (LDPE), linear low density polyethylene (LLDPE) and polyvinyl chloride (PVC).

22. The packaging material of claim 20, wherein the thermoplastic polymer comprises a polyester resin selected from the group consisting of polyethylene terephthalate (PET) homopolymer, polyethylene terephthalate copolymers and polyethylene naphthenate copolymers.

23. The packaging material according to claim 18, wherein the packaging material comprises a cellulosic material, the cellulosic material being one of a web and a layer, wherein the cellulosic material comprises a continuous array of randomly oriented cellulosic fibers.

24. The packaging material of claim 18, wherein the amount of cyclodextrin derivative in the matrix material is in the range from about 0.01 to 5 wt-% based on the matrix material.

25. The packaging material of claim 18, wherein the cyclodextrin material comprises at least one substituent, the at least one substituent being selected from the group consisting of a silyl ether group, an alkyl ether group, an alkyl alcohol group and an alkyl ester group.

26. The packaging material of claim 25, wherein the alkyl ester substituents comprise at least one of acetyl moieties, propyl moieties and butyl moieties.

27. The packaging material of claim 25, wherein the alkyl ether substituents comprise at least one of methyl moieties, ethyl moieties and propyl moieties.

28. The packaging material of claim 25, wherein the silyl ether substituents comprise at least one of methyl moieties, ethyl moieties, propyl moieties and butyl moieties.

29. The packaging material of claim 25, wherein the alkyl alcohol substituents comprise at least one of hydroxypropyl moieties and hydroxyethyl moieties.

30. The packaging material of claim 18, wherein the packaging material comprises at least two layers, wherein at least one layer of the at least two layers comprises a matrix material and a cyclodextrin material.

31. The packaging material of claim 30, wherein at least one layer of the at least two layers comprising the matrix material and a cyclodextrin material is one of a coating layer and a laminate film layer.

32. The packaging material of claim 18, wherein the packaging material has a form selected from the group consisting of a coated monolayer film, a coated bilayer film, a coated multilayer film, a metal foil and paperboard having one and more extrusion coatings on a surface or on both surfaces, a coated cellulosic web and a cellulosic web/film laminate; and wherein the cyclodextrin material is a part of at least one of the web, the film and the coating.

33. A method for manufacturing a packaging material comprising the steps of:

providing a matrix material; and dispersing a cyclodextrin material having a moisture content of about 0 wt.-%, based on the cyclodextrin material in the matrix material.

34. The packaging material of claim 1 wherein the moisture content of the cyclodextrin material is in the range between 0.3 wt.-% and 3 wt.-% of cyclodextrin material.

35. The packaging material of claim 1 wherein the moisture content of the cyclodextrin material is in the range between 0.5 wt.-% and 2 wt.-% of cyclodextrin material.

36. The packaging material of claim 1 wherein the moisture content of the cyclodextrin material is in the range between 0.75 wt.-% and 2 wt.-% of cyclodextrin material.

37. The packaging material of claim 1 wherein the amount of cyclodextrin derivative in the matrix material is in the range from about 0.01 to 1 wt-% based on the matrix material.

38. The packaging material of claim 18 wherein the amount of cyclodextrin derivative in the matrix material is in the range from about 0.01 to 1 wt-% based on the matrix material.

* * * * *